(12) United States Patent
Tang et al.

(10) Patent No.: US 8,045,107 B2
(45) Date of Patent: Oct. 25, 2011

(54) COLOR-TUNABLE PLASMONIC DEVICE WITH A PARTIALLY MODULATED REFRACTIVE INDEX

(75) Inventors: Liang Tang, Vancouver, WA (US); Akinori Hashimura, Vancouver, WA (US); Apostolos T. Voutsas, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 168 days.

(21) Appl. No.: 12/614,368

(22) Filed: Nov. 6, 2009

(65) Prior Publication Data

US 2011/0109854 A1 May 12, 2011

(51) Int. Cl.
*G02F 1/1335* (2006.01)
*G02B 26/00* (2006.01)
*H01L 21/00* (2006.01)

(52) U.S. Cl. ........ 349/117; 349/106; 349/166; 349/187; 359/290; 438/30

(58) Field of Classification Search .................. 349/117, 349/166, 187, 106; 385/1, 901, 122; 359/290; 438/30
See application file for complete search history.

(56) References Cited

U.S. PATENT DOCUMENTS

| | | | |
|---|---|---|---|
| 7,319,554 B1 * | 1/2008 | Abe et al. ..................... | 359/296 |
| 7,715,086 B2 * | 5/2010 | Yamamoto et al. ........... | 359/296 |
| 2006/0066803 A1 * | 3/2006 | Aylward et al. .............. | 349/158 |
| 2008/0142819 A1 * | 6/2008 | Liu et al. ..................... | 257/89 |
| 2011/0109854 A1 * | 5/2011 | Tang et al. ................... | 349/117 |
| 2011/0109956 A1 * | 5/2011 | Hashimura et al. .......... | 359/290 |

FOREIGN PATENT DOCUMENTS

| JP | 2006-343650 | 12/2006 |
|---|---|---|
| JP | 2007-240617 | 9/2007 |
| WO | WO 2008147403 | 12/2008 |

OTHER PUBLICATIONS

Chu et al., Electically Controlled surface plasmon resonance frequency of gold nanorods, Appl. Phys. Lett.,89, pp. 103107, 2006.
Xu, G. et al., Wavelength Tuning of surface plasmon resonance using dielectric layers on siliver island films, Appl. Phys. Lett., 82, No. 23, pp. 3811, Jun. 2003.

(Continued)

*Primary Examiner* — Brian Healy
(74) *Attorney, Agent, or Firm* — Law Office of Gerald Maliszewski; Gerald Maliszewski

(57) ABSTRACT

A color-tunable plasmonic device is provided with a partially modulated refractive index. A first dielectric layer overlies a bottom electrode, and has a refractive index non-responsive to an electric field. A second dielectric layer overlies the first dielectric layer, having a refractive index responsive to an electric field. An electrically conductive top electrode overlies the second dielectric layer. A plasmonic layer including a plurality of discrete plasmonic particles is interposed between the top and bottom electrodes. In one aspect, the plasmonic layer is interposed between the first and second dielectric layers. In a second aspect, the plasmonic layer is interposed between the first dielectric layer and the bottom electrode. In a third aspect, a first plasmonic layer is interposed between the first dielectric layer and the bottom electrode, and a second plasmonic layer of discrete plasmonic particles is interposed between the first dielectric layer and the second dielectric layer.

26 Claims, 8 Drawing Sheets

OTHER PUBLICATIONS

Biswas, A. et al., Tunable multiple plasmon resonance wavelengths response from multicomponent polymer-metal nanocomposite systems, Appl. Phys., vol. 84, #14, pp. 2655, 2004.
Zhang, Z. et al., Extinction spectra and electrical field enhancement of Ag nanorods with different topologic shapes, J. Appl. Phys, 102, pp. 113308, 2007.
Olcum, S. et al., Tunable surface plasmon resonance on an elastomeric substrate, Optics Express, vol. 17 # 10, pp. 8545, 2009.
Heinz Raether, "Surface plasmons on smooth and rough surfaces and on gratings", Springer-Verlag, 1986.
C. F. Bohren and D. R. Huffman, Absorption and scattering of light by small particles (Wiley-Interscience, New York, 1983).
G. Mie, "Beiträge zur Optik trüber Medien, speziell kolloidaler Metallösungen,". Leipzig, Ann, Phys. 330. 377-445 (1908).
J. N. Anker, etc, "Biosensing with plasmonic nanosensors", Nature Materials 7, 447 (2008).
Catchpole, etc, "Plasmonic solar cells", Optics Express 16, 21793 (2008).
C. Novo, etc. "Direct observation of chemical reactions on single gold nanocrystals using surface plasmon spectroscopy", Nature Nanotechnoiogy 3, 598 (2008).
S, Gauze, etc, "Super High Birefringence Isothiocyanato Biphenyl-Bistolane Liquid Crystais", Japanese Journal of Applied Physics, vol. 43, No. 11A, 2004, pp. 7634-7638.

* cited by examiner

COLOR-TUNABLE PLASMONIC DEVICE WITH A PARTIALLY MODULATED REFRACTIVE INDEX

BACKGROUND OF THE INVENTION

1. Field of the Invention

This invention generally relates to electronic visual display devices and, more particularly, to a color-tunable plasmonic display device that relies upon both modulated and non-modulated refractive index layers.

2. Description of the Related Art

Reflective display or color-tunable device technology is attractive primarily because it consumes substantially less power than liquid crystal displays (LCDs) and organic light emitting diode (OLED) displays. A typical LCD used in a laptop or cellular phone requires internal (backlight) illumination to render a color image. In most operating conditions the internal illumination that is required by these displays is in constant competition with the ambient light of the surrounding environment (e.g., sunlight or indoor overhead lighting). Thus, the available light energy provided by these surroundings is wasted, and in fact, the operation of these displays requires additional power to overcome this ambient light. In contrast, reflective display technology makes good use of the ambient light and consumes substantially less power.

A number of different reflective display technologies have been developed, such as electrophoretic, electrowetting, electrochromic displays, and interference-based MEMS display. These display technologies all have disadvantages or challenges that must be overcome to obtain greater commercial success. Many existing technologies rely upon phenomena that are intrinsically slow. For example, electrophoretic or electrochemical techniques typically require particles to drift or diffuse through liquids over distances that create a slow response. Some other technologies require high power to operate at video rates. For example, many reflective displays must switch a large volume of material or chromophores from one state to another to produce an adequate change in the optical properties of a pixel. At video switching rates, currents on the order of hundreds of $mA/cm^2$ are necessary if a unit charge must be delivered to each dye molecule to affect the change. Therefore, display techniques that rely on reactions to switch dye molecules demand unacceptably high currents for displaying video. The same holds true for electrochromic displays.

A second challenge for reflective displays is the achievement of high quality color. In particular, most reflective display technologies can only produce binary color (color/black) from one material set. Because of this, at least three sub-pixels using different material sets must be used when employing a side-by-side sub-pixel architecture with fixed colors. This limits the maximum reflected light for some colors to about ⅓, so that the pixel's of this type cannot produce saturated colors with a good contrast.

Finally, some reflective displays face reliability problem over a long lifetime. In particular, to sustain video rate operation for a few years requires at least billions of reversible changes in optical properties. Achieving the desired number of cycles is particularly difficult in reflective displays using techniques based on chemical reactions, techniques that involve mixing and separation of particles, or MEMS technology that involves repeated mechanic wear or electric stress.

It would be advantageous if a low power color display existed that overcame all of the above-mentioned problems.

SUMMARY OF THE INVENTION

The full range of colors produced by plasmon resonances resulting from metal nanostructures has been known since ancient times as a means of producing stained colored glass. For instance, the addition of gold nanoparticles to otherwise transparent glass produces a deep red color. The creation of a particular color is possible because the plasmon resonant frequency is generally dependent upon the size, shape, material composition of the metal nanostructure, as well as the dielectric properties of the surroundings environment. Thus, the optical absorption and scattering spectra (and therefore the color) of a metal nanostructure can be varied by altering any one or more of these characteristics.

Described herein is a method for the electrical tuning of the refractive index of the surrounding dielectric material. By making use of the tunable refractive index of liquid crystal or other electro-optical materials, the plasmonic resonance of the metal nanostructures can be tuned across the visible range and, thus, a pixel can exhibit different colors under different external voltages. Liquid crystal typically has a response time of a few milliseconds or shorter and, therefore, is fast enough for video applications. An extremely wide color tuning range, as well as a broad range of viewing angles has been unexpectedly achieved by using a tunable refractive index dielectric, in combination with a dielectric layer having a non-varying refractive index that at least partially surrounds a layer of plasmonic metal particles.

The color-tunable device operates with ambient light and does not normally require backlight illumination. The visual appearance of such a display may be like that of a traditional photograph, but with the capability to render both still and fast-moving images. Since ambient illumination is used to render these images, the power requirements of such a display are dramatically less than a standard LCD and, therefore, reduce the power consumption when introduced into devices such as a cellular phone or laptop. With this technology; the realization of video-embedded and interactive magazines and books is possible, the content of which can be modified electrically in real-time.

Accordingly, a color-tunable plasmonic device is provided with a partially modulated refractive index. The device comprises an electrically conductive bottom electrode. A first dielectric layer overlies the bottom electrode, having a refractive index non-responsive to an electric field. A second dielectric layer overlies the first dielectric layer, having a refractive index responsive to an electric field. For example, the second dielectric may have a refractive index that varies between 1.0 and 3, in any direction, in response to an electric field. An electrically conductive top electrode overlies the second dielectric layer. A plasmonic layer including a plurality of discrete plasmonic particles is interposed between the top and bottom electrodes. The electrodes may be transparent or reflective.

In one aspect, the plasmonic layer is interposed between the first and second dielectric layers. In a second aspect, the plasmonic layer is interposed between the first dielectric layer and the bottom electrode. In a third aspect, a first plasmonic layer is interposed between the first dielectric layer and the bottom electrode, and a second plasmonic layer of discrete plasmonic particles is interposed between the first dielectric layer and the second dielectric layer. To achieve color variation the plasmonic particles in the first plasmonic layer may be arranged in a random order or symmetrical array. Likewise, color variation can be achieved using different plasmonic particle shapes and sizes.

Additional details of the above-described color-tunable plasmonic device, as well as a method for creating colors in the visible spectrum using a tunable plasmonic device with a partially modulated refractive index, are provided below.

DETAILED DESCRIPTION

Figure 1:
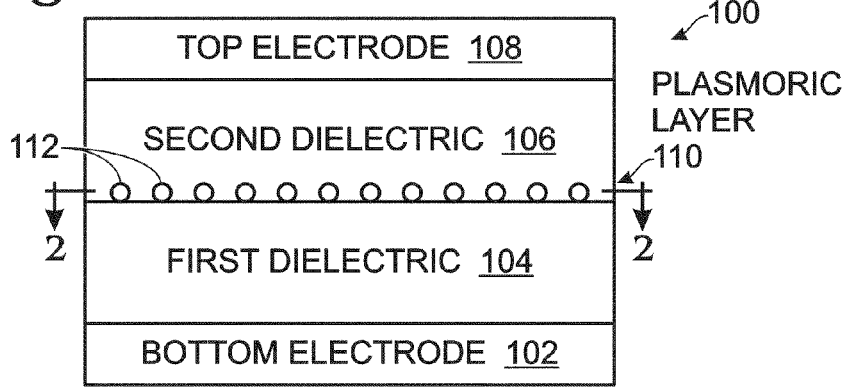
FIG. 1 is a partial cross-sectional view of a color-tunable plasmonic device with a partially modulated refractive index.

FIG. 1 is a partial cross-sectional view of a color-tunable plasmonic device with a partially modulated refractive index. The device 100 comprises an electrically conductive bottom electrode 102, and a first dielectric layer 104 overlying the bottom electrode 102. The first dielectric layer has a refractive index that is non-responsive to an electric field. Some examples of first dielectric materials include SiOx, SiNx, SiOxNy, MgF2, CaF2, SiOC, Teflon® AF, and organic polymers. However the device is not necessarily limited to just these materials. A second dielectric layer 106 overlies the first dielectric layer 104, having a refractive index responsive to an electric field. Some examples the second dielectric material include ferroelectric liquid crystals, nematic liquid crystals, LiNbO3, Hg2Cl2, LiTaO3, BBO, KTP, and organic electro-optical crystal 2,6-dibromo-N-methyl-4-nitroaniline. Again, the device 100 is not limited to just these materials. The change in refractive index is dependent upon a number of variables including applied voltage and material thicknesses. Generally however, the second dielectric 106 has a refractive index that varies between 1.0 and 3, in any direction, in response to an electric field. Since refractive index is direction-dependent, the refractive index value may be defined as the "effective" value or "average" value, as well as the individual component value (along a particular direction).

An electrically conductive top electrode 108 overlies the second dielectric layer 106. Generally, a first plasmonic layer 110, including a plurality of discrete plasmonic particles 112, is interposed between the top electrode 108 and bottom electrode 102. As shown in FIG. 1, the first plasmonic layer 110 overlies the first dielectric layer. The second dielectric layer 106 overlies the first plasmonic layer particles 112 and exposed regions of the first dielectric layer 104 between the first plasmonic layer particles 112.

Figure 2:
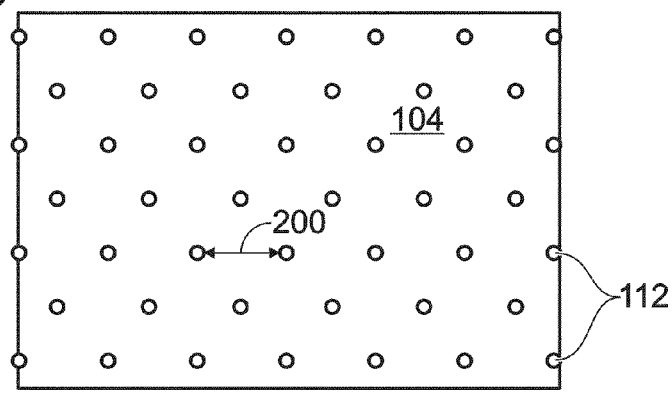
FIG. 2 is a plan view of the plasmonic layer of FIG. 1.

FIG. 2 is a plan view of the plasmonic layer 110 of FIG. 1. The plasmonic particles 112 in the first plasmonic layer 110 may be arranged in a random order, or in a symmetrical array (as shown). A wide variety of two dimensional (2-D) and three dimensional array patterns are known in the art. Shown is a 2-D triangle pattern array, but the device is not limited to any particular type of array pattern.

Figure 3:
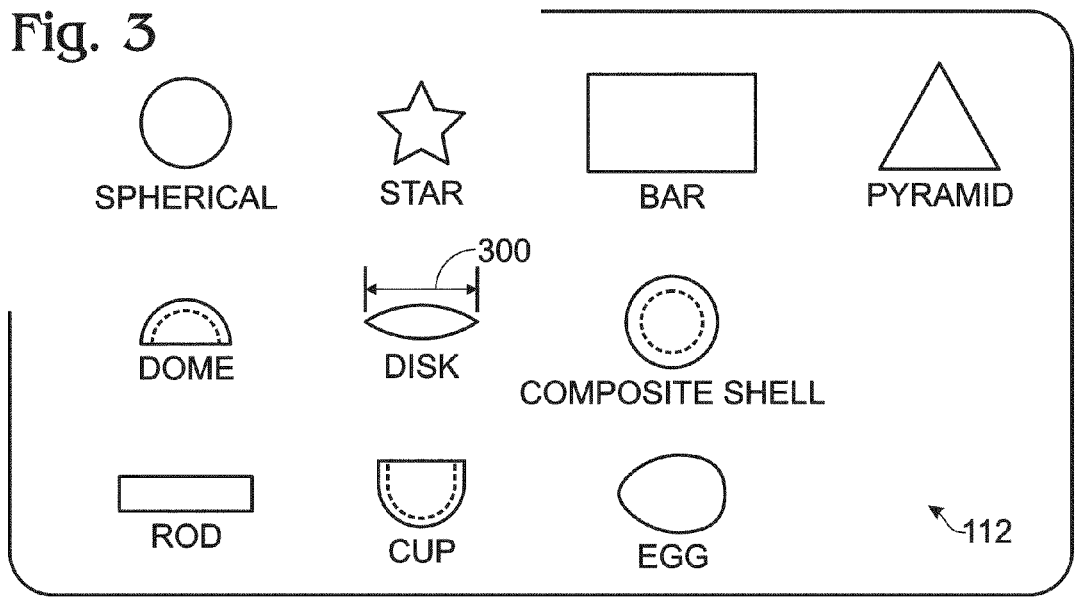
FIG. 3 is a plan view depicting a variety of plasmonic particle structures.

FIG. 3 is a plan view depicting a variety of plasmonic particle structures. Some possible structures include spherical, disk, composite shell, dome, egg, cup, rod, bar, pyramid, and star. Note: the composite shell structure may comprise a metal core surrounded by a dielectric shell, or a dielectric core surrounded by a metal shell. In one aspect, the composite shell dielectric may have a refractive index that varies in response to electric fields. Note: the device may be enabled using other structures, as an exhaustive collection of structures and shapes in not shown. It should also be noted that the plasmonic layer may be comprised of a plurality of (different) particle structures.

In one aspect, the plasmonic particles 112 in the first plasmonic layer have a uniform size. Alternately the first plasmonic layer is comprised of a plurality of particle sizes. Typically, the plasmonic particles have a size 300 or diameter in the range of 10 nanometers (nm) to 300 nm. Some plasmonic particle materials include Ag, Au, Cu, Pt, Al, and alloys of the above-mentioned metals.

Returning to FIG. 2, the plasmonic particles 112 have an average spacing 200 between particles, which is typically in the range of about 700 nm, or less.

Figure 4:
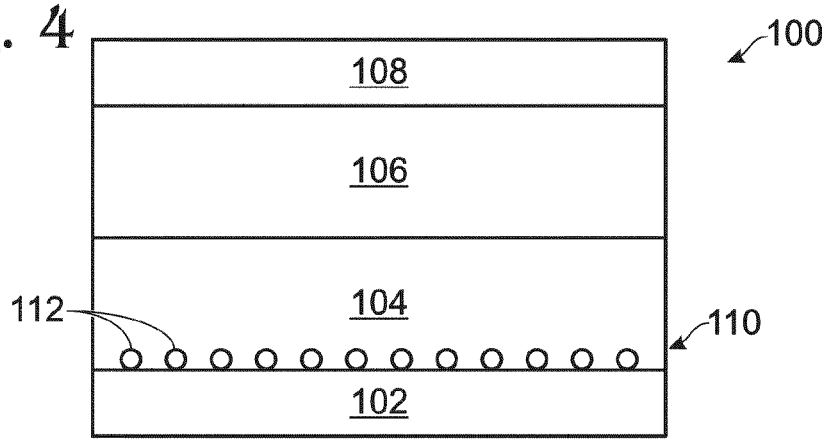
FIG. 4 is a partial cross-sectional view of a variation of the plasmonic device of FIG. 1.

FIG. 4 is a partial cross-sectional view of a variation of the plasmonic device of FIG. 1. In this aspect, the first plasmonic layer 110 overlies the bottom electrode 102. The first dielectric layer 104 overlies the first plasmonic layer particles 112 and exposed regions of the bottom electrode 102 between the first plasmonic layer particles.

Figure 5:
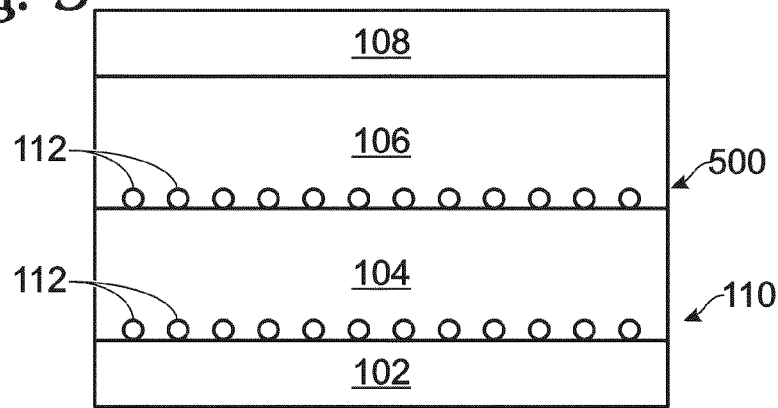
FIG. 5 is a partial cross-sectional view depicting a variation of the plasmonic device of FIG. 4.

FIG. 5 is a partial cross-sectional view depicting a variation of the plasmonic device of FIG. 4. In this aspect, the first plasmonic layer 110 overlies the bottom electrode 102. The first dielectric layer 104 overlies the first plasmonic layer particles 112 and exposed regions of the bottom electrode 102 between the first plasmonic layer particles. Further, a second plasmonic layer 500 of discrete plasmonic particles 112 overlies the first dielectric layer 104. The second dielectric layer 106 overlies the second plasmonic layer 500 particles and exposed regions of the first dielectric layer 104 between the second plasmonic layer particles.

Referencing FIG. 1, 4, or 5, either the top electrode 108 or bottom electrode 102 may be optically reflective to a first range of wavelengths in the visible spectrum of light. The other electrode is transparent to the first range of light wavelengths. Thus, the device 100 is reflective—accepting ambient (white) light and reflecting a color. For example, indium tin oxide (ITO) or ZnO can be used as a transparent electrode and Al, Ti, or Cu can be used as a reflective electrode material. Alternately, both the top electrode 108 and bottom electrode 102 may be transparent to the first range of wavelengths in the visible spectrum of light. In that case, the device 100 is transmissive—accepting ambient (white) light and passing a tuned color.

A number of different multilayer plasmonic devices may be formed by combining the device structures shown in FIGS. 1, 4, and 5.

Functional Description

As shown in FIG. 1, discrete plasmonic structures 112 are adjacent to a medium 106 having dielectric properties that can be altered through a stimulus. In addition, the discrete plasmonic structures are also adjacent to a medium 104 that cannot be altered through a stimulus. It should also be noted that the first dielectric medium 104 can be a solid, as well as a liquid.

Figure 6:
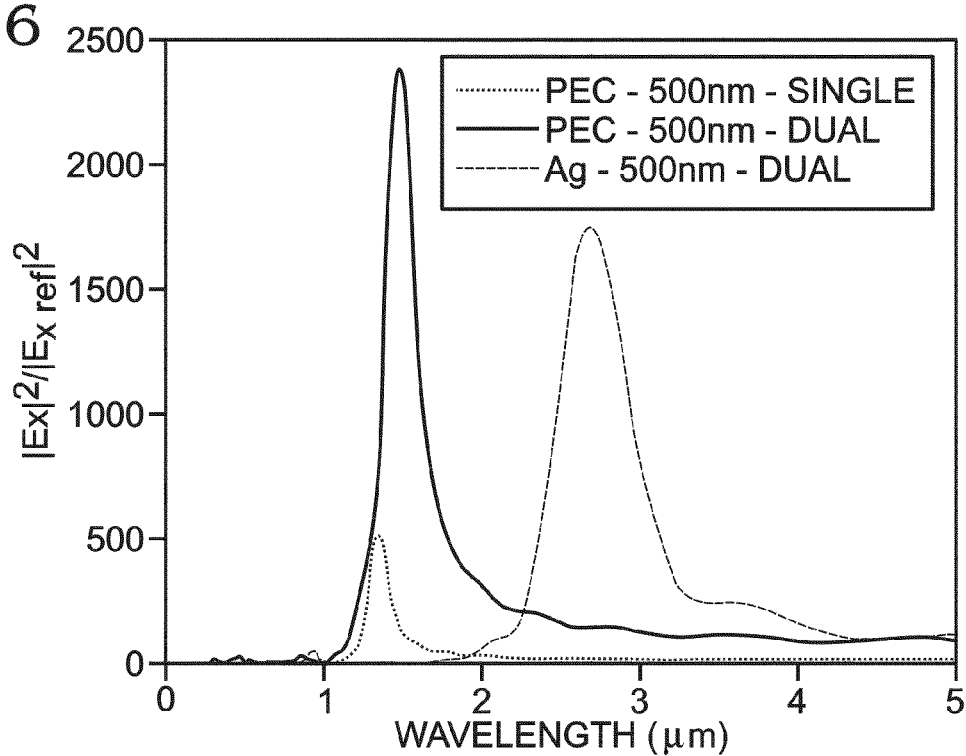
FIG. 6 is a graph depicting the colors achieved by varying plasmonic particle materials and placement.

FIG. 6 is a graph depicting the colors achieved by varying plasmonic particle materials and placement. Shown are Perfect Electric Conductor (PEC) material plasmonic particles shaped as 500 nm length nanorods and separated by a distance much greater than 700 nm. Also shown are PEC material plasmonic particles (nanorods) paired in groups of two, separated by a distance of 100 nm, as well as paired Ag material plasmonic particles. It is clear that the responses are significantly different in terms of wavelength, amplitude and spectral linewidth.

As shown in FIG. 4, plasmonic discrete structures are adjacent to a first dielectric medium 104 that cannot be altered through a stimulus, and not immediately adjacent to the dielectric medium 106 that can be altered by a stimulus. As shown in FIG. 5, more than one layer of plasmonic nanoparticles can be formed with alterable and alterable mediums.

In all of the above-mentioned structures, the desired frequency of light is not only dependent upon the discrete plasmonic particle structure, but also dependent upon the coupling between these discrete structures. Both the resonant peak amplitude and spectral width of the system can be drastically altered by varying the particle density and arrangement. Thus, instead of each discrete plasmonic structure having the same plasmon resonant frequency, as is conventional, the discrete plasmonic structures in the devices shown in FIGS. 1, 4, and 5 can have more than one resonant frequency, due to a variety of different sizes, shapes, and spacings.

Figure 7:
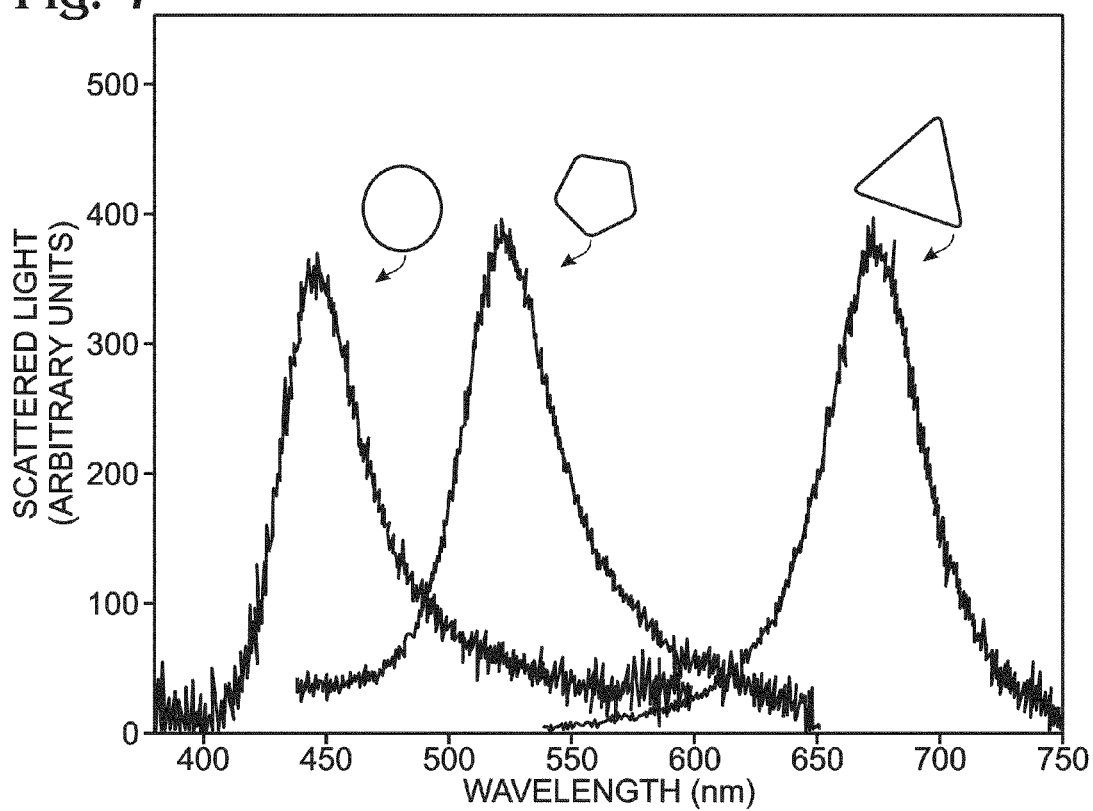
FIG. 7 is a graph depicting the relationship between particle shape and color wavelength.

FIG. 7 is a graph depicting the relationship between particle shape and color wavelength. Particle shape and size are both very important in determining the scattering spectrum, as shown. Additionally, the plasmon shift per unit refractive index change is different for different particle shapes.

Plasmons, which are quantized oscillations of the free electron gas in a metal or other material, affect how light interacts with a structure and thereby determine the apparent color of the structure. This interaction generally occurs through the coupling of surface plasmons with light to form surface plasmon-polaritons. Tuning the color of a metal nanostructure is possible because the plasmon resonant frequency of such structures generally depends on the size, shape, and the dielectric properties of the surrounding material. Thus, the optical absorption and scattering spectra (and therefore the color) of a metal structure can be varied by altering any one or more of these characteristics.

Figure 8:
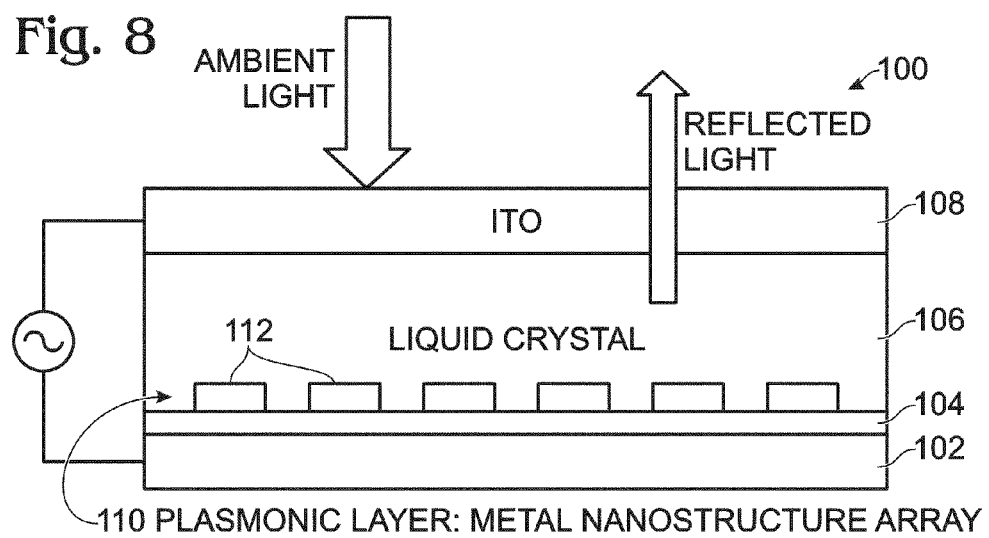
FIG. 8 is a partial cross-sectional view depicting an explicit implementation of the device of FIG. 1.

FIG. 8 is a partial cross-sectional view depicting an explicit implementation of the device of FIG. 1. Electrical modulation of a dielectric refractive is relatively easy to implement in an actual device. ITO or some other transparent conductor layers are used for the electrical contacts on the top and bottom. The plasmonic metal nanostructures are located at the interface between a liquid crystal 106 and a non-varying dielectric layer 104. Alternately, the first dielectric layer 104 may be comprised of multiple dielectric layers. The plasmonic metal nanostructures can be a random or an ordered array of metal nanoparticles with a variety of shapes, including but not limited to nano-spheres, nano-disks, nano-shells, nano-eggs, nano-cups, nanorods, nano-bars, nano-pyramids, and nano-stars. They can also be particles with a dielectric core but metallic coating, or any other radial or axial combinations. The distance between nanoparticles is on the order of optical wavelength or below the wavelength. With a tunable refractive index, plasmon resonances in metal nanostructures provide tunable optical scattering or absorbing mechanisms for binary or continuous color variation suitable for use in still image and video displays.

For particles with diameters well below the wavelength of light, a point dipole model describes the absorption and scattering of light well. The scattering and absorption cross-sections are given by the following equations:

$$C_{scat} = \frac{1}{6\pi}\left(\frac{2\pi}{\lambda}\right)^4 |\alpha|^2, \quad C_{abs} = \frac{2\pi}{\lambda}\text{Im}[\alpha]$$

$$\alpha = 3V\left[\frac{\varepsilon_p/\varepsilon_m - 1}{\varepsilon_p/\varepsilon_m + 2}\right]$$

$\alpha$ is the polarizability of the particle. Here V is the particle volume, $\varepsilon_p$ is the dielectric function of the particle and $\varepsilon_m$ is the dielectric function of the embedding medium. When $\varepsilon_p = -2\varepsilon_m$ the particle polarizability becomes very large. This relationship is known as the localized plasmon resonance. For the nanoplasmonic display described above, it is important that scattering is more efficient than absorption because a high reflectivity is desired, which is directly related to the scattered light. This condition is clearly met for larger particles, as follows from above equation (note that the two cross sections have different dependence on the particle volume V). Typically, a Ag particle with a diameter of 100 nm has an albedo (scattering cross section over sum of scattering and absorption cross sections) that exceeds 0.9. In such a scenario, the absorption process is negligible and the plasmon resonance is represented by the scattered light.

Figure 9:
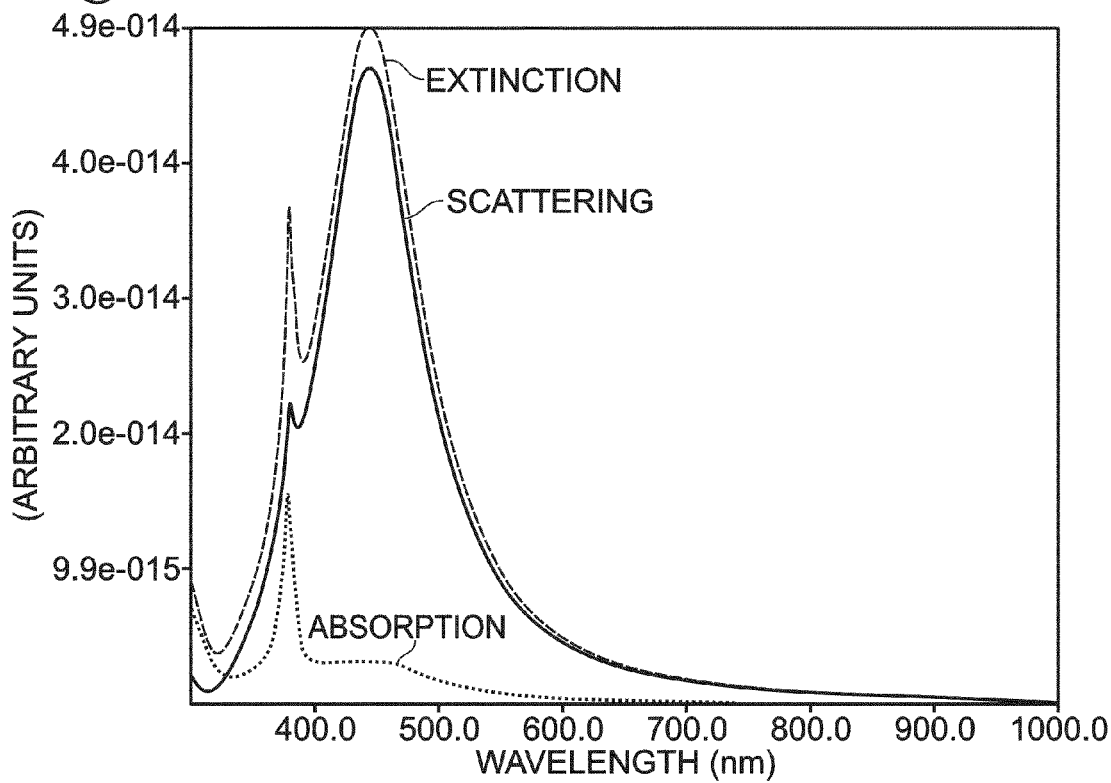
FIG. 9 is a graph depicting calculated scattering, absorption, and extinction cross-sections of a Ag nanoparticle in water with a diameter of 80 nm.

FIG. 9 is a graph depicting calculated scattering, absorption, and extinction cross-sections of a Ag nanoparticle in water with a diameter of 80 nm. It is evident that the majority of the incident light is scattered, as shown.

Figure 10:
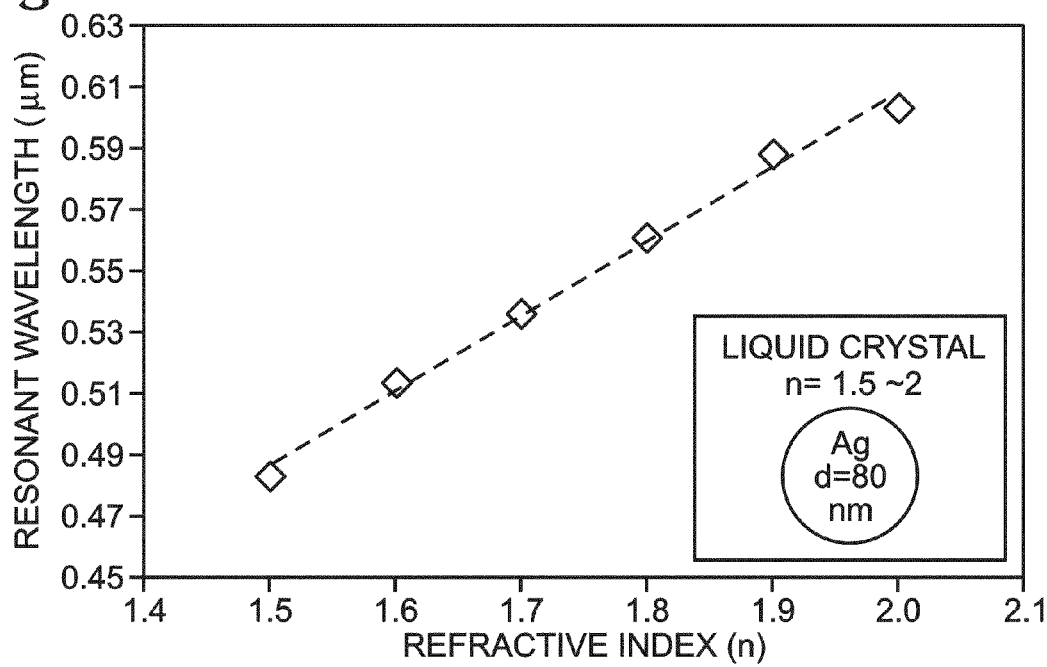
FIG. 10 is a graph plotting resonant wavelength dependence on the refractive index n of the surrounding medium for a Ag nanoparticle with a diameter of 80 nm, as calculated by the Finite Difference Time Domain (FDTD) method.

FIG. 10 is a graph plotting resonant wavelength dependence on the refractive index n of the surrounding medium for a Ag nanoparticle with a diameter of 80 nm, as calculated by the Finite Difference Time Domain (FDTD) method. The resonant wavelength generally scales linearly with the refractive index of the surrounding medium, although the exact relationship depends also on the size, shape and distribution of the metal nanostructures. When the surrounding index n varies from 1.5 to 2, the resonant wavelength shifts from 490 nm to 610 nm. Here Lorentz-Drude Model is used to incorporate the spectroscopic data of Ag material across the wavelength range of interest.

In a display, it is not convenient to frequently change the dielectric material surrounding the metal nanostructures, which typically leads to slow responses. The most-common means for index tuning is electro-optical tuning, where a constituent material possesses an electro-optics response such as the Pockel effect, where the refractive index change is proportional to the applied electric field, or the Kerr effect where the refractive index change is proportional to the square modulus of the electric field. Liquid crystals are ideal candidate materials for such tunable applications and are well known through their use in display technology. The large broadband optical anisotropy of these molecules makes them ideal candidates for electrically operated nanoplasmonic devices. The dielectric properties of liquid crystal can be changed through application of an external voltage. Ferroelectric liquid crystals possess the Pockel effect that allows index tuning up to 0.3 for an applied voltage on the order of a few V/μm, while nematic liquid crystals possess the Kerr effect that allows similar index tuning at a similar voltage requirement. An approximate isotropic treatment of nematic LCs has been employed to design and analyze the interaction of liquid crystal and metal nanostructures. However, Pockel, Kerr, and other nonlinear optical properties of LCs arise from their anisotropy birefringence and the crystalline axis reorientation by the applied field. Therefore, the rigorous anisotropic treatment of LC elements may be needed in analyzing the electromagnetic response of such complex structures.

Figure 11:
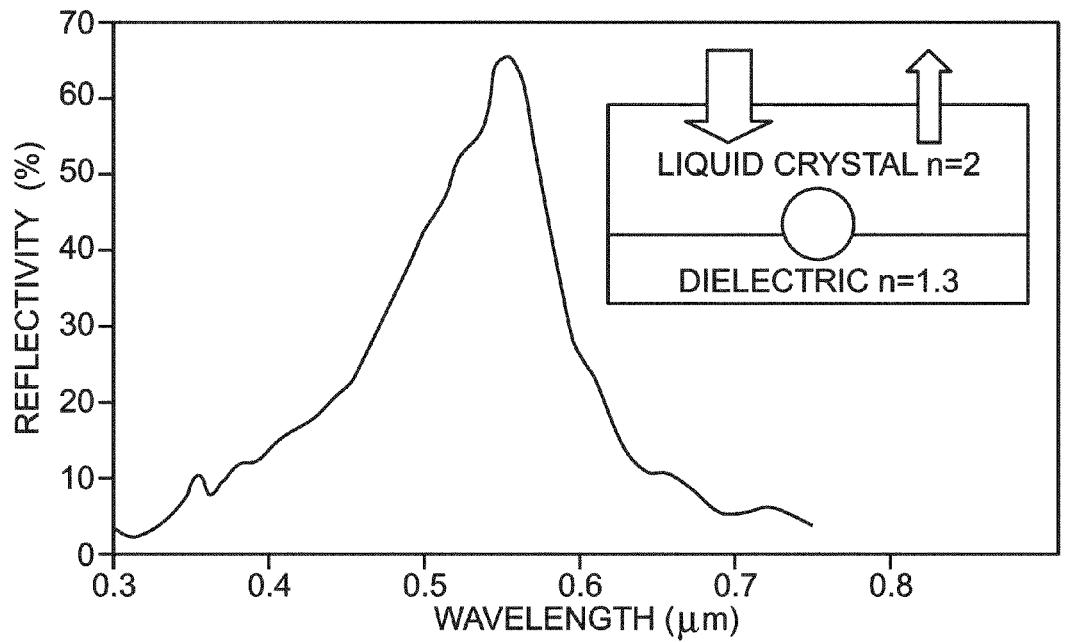
FIG. 11 is a graph showing the calculated reflectivity spectrum of a Ag nanoparticle with a diameter of 80 nm.

FIG. 11 is a graph showing the calculated reflectivity spectrum of a Ag nanoparticle with a diameter of 80 nm. Reflectivity is an important figure of merit for reflective displays. The simulation setup to the right of the graph shows a Ag nanoparticle located at the interface between the liquid crystal and a bottom dielectric layer. The reflectivity at its resonant wavelength is ~65%. Note that the reflectivity depends on both the particle density and the surrounding dielectric interfaces. Generally a higher particle density leads to a higher reflectivity. It is also possible to modify the reflectivity by modifying the surrounding interfaces.

Figure 12A:
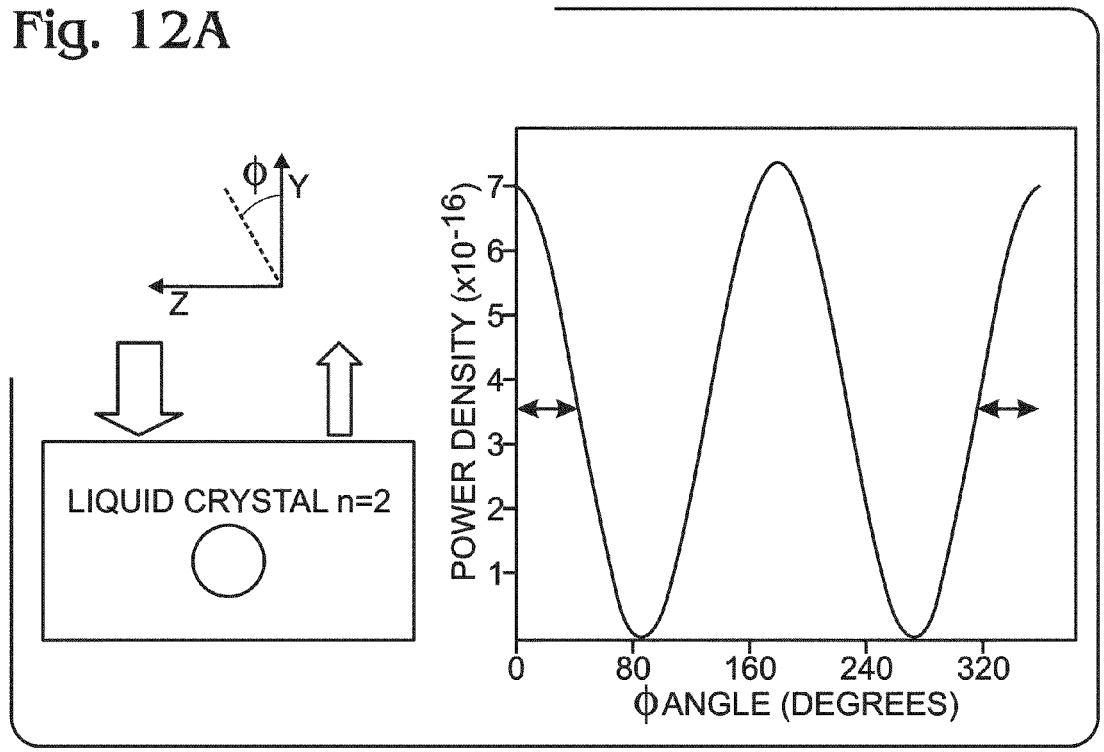
FIGS. 12A and 12B illustrate the calculated angle dependence for two different scenarios.
Figure 12B:
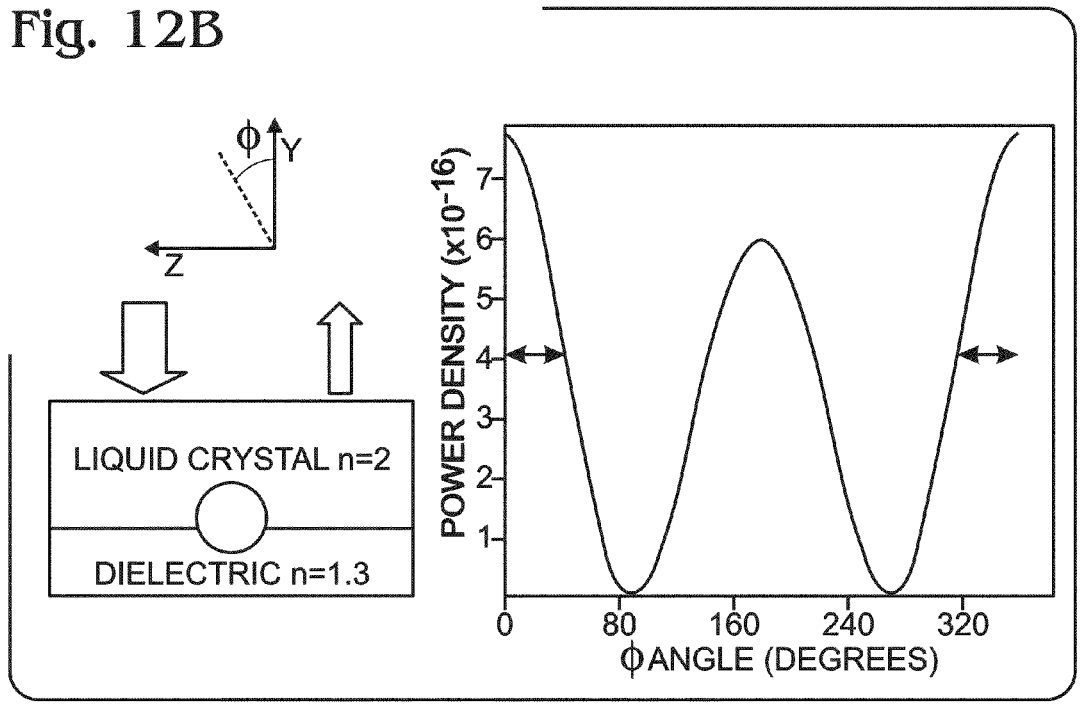

FIGS. 12A and 12B illustrate the calculated angle dependence for two different scenarios. In FIG. 12A the nanoparticle is completely immersed in the liquid crystal. In FIG. 12B the nanoparticle is located at the liquid crystal/dielectric interface. Note that in the FDTD simulation the liquid crystal is assumed to be optically isotropic. Angle dependence is another important factor for displays. It is not desirable that color or brightness changes in response to different viewing angles. For both scenarios, the FWHM angle is about 90 degrees. Therefore, the device has very weak angle dependence. FIG. 12A shows about 50% backscattering, corresponding to the angles from 0 to 90 degrees and from 270 to 360 degrees. However, FIG. 12B shows that the backscattering process is stronger than the forward scattering (90 to 270 degrees). This indicates that the reflectivity is significantly higher than 50% for the structure of FIG. 12B. This calculation also supports previous argument that the reflectivity can be improved by carefully engineering the interfaces surrounding the Ag nanoparticle. In fact, if the two dielectric materials have substantially different dielectric constants, the emission pattern can be significantly different.

Figure 13:
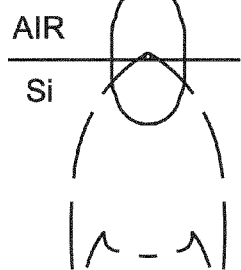
FIG. 13 is the radiation pattern for a dipole with a dipole moment parallel to the surface, placed 20 nm above a silicon substrate.
Figure 13:
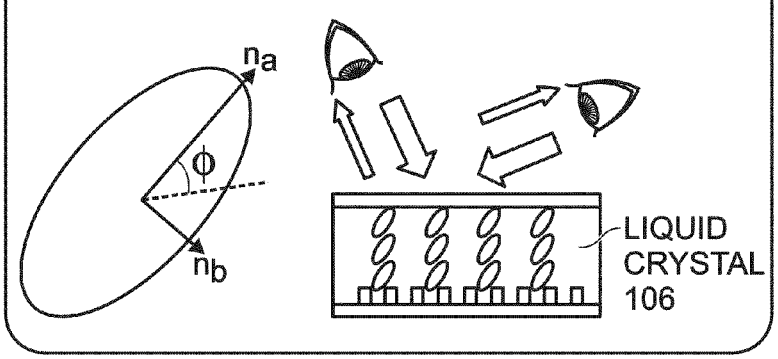

FIG. 13 is the radiation pattern for a dipole with a dipole moment parallel to the surface, placed 20 nm above a silicon substrate. The radiation pattern for an electric dipole in free space is plotted for reference (black solid line). For the dipole above a silicon surface, only a tiny, barely visible, fraction of the light is radiated into the air, while the vast majority (96%) is radiated into the silicon. The radiation pattern strongly depends on the surrounding dielectric interface.

Figure 14:
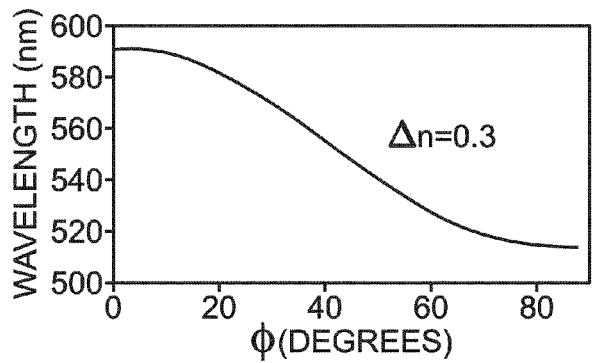
FIG. 14 is a diagram depicting the angle dependence of the resonant wavelength for an anisotropic liquid crystal material.

FIG. 14 is a diagram depicting the angle dependence of the resonant wavelength for an anisotropic liquid crystal material. The above calculation does not take into account of the anisotropic nature of the liquid crystal material. If the anisotropy of refractive index is incorporated into the calculation, the angle dependence of the resonant wavelength is as shown. As the viewing angle changes from 0 to 90 degrees, the reflected resonant wavelength shifts from 520 to 590 nm. This color shift problem due to viewing angle may be overcome externally by putting an optical diffusion layer on top of the pixel, or internally by using divided LC domains.

The color purity of the technology is important to achieve a large color gamut, which is determined by the resonant linewidth of the plasmon resonance. As shown in FIG. 11, the plasmon resonance for a spherical nanoparticle is typically around 100 nm. In order to reduce the resonant linewidth, other shapes of nanoparticles can be used.

Figure 15A:
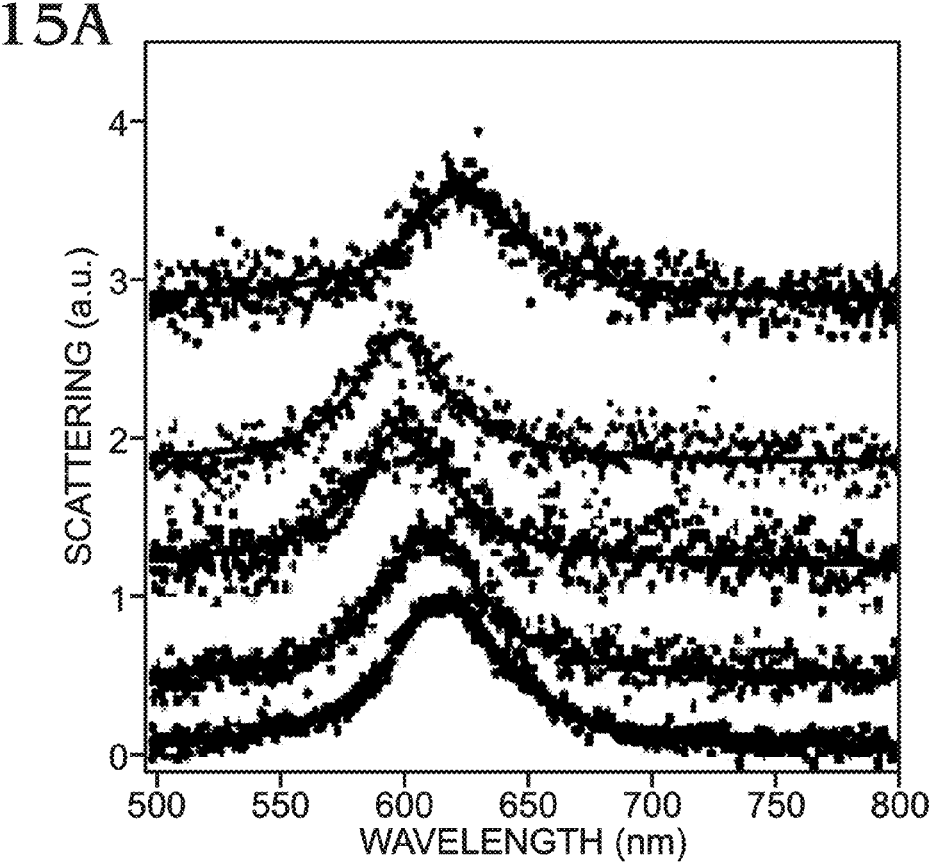
FIGS. 15A and 15B depict the relationship between resonant linewidth and plasmonic particle shape.
Figure 15B:
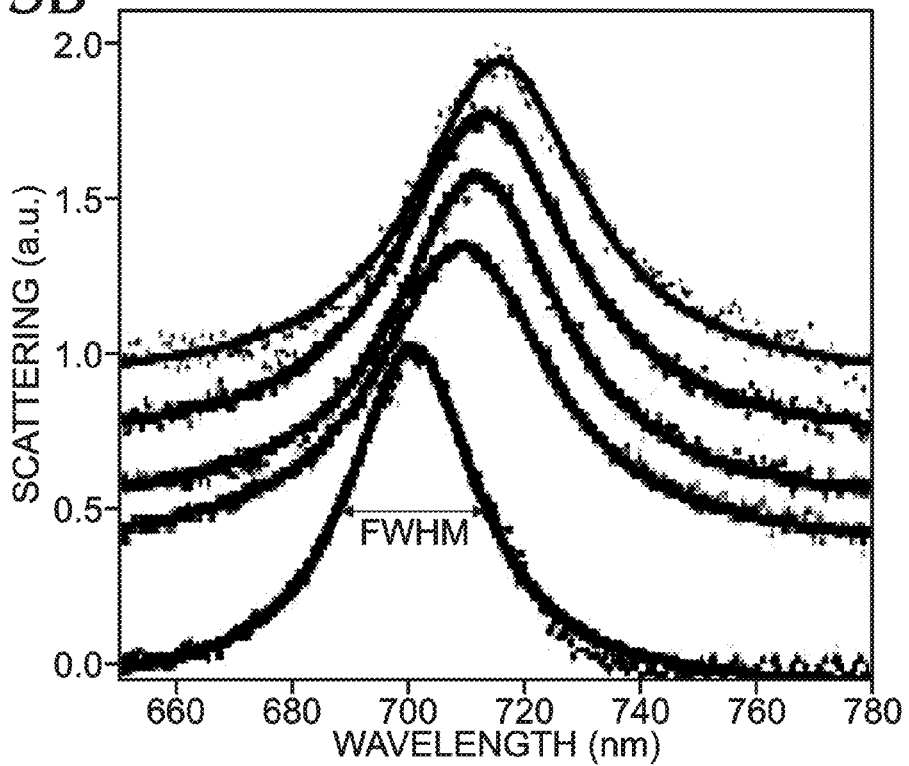

FIGS. 15A and 15B depict the relationship between resonant linewidth and plasmonic particle shape. In FIG. 15A, a Au decahedron has a resonant linewidth of ~50 nm (FWHM), and in FIG. 15B a Au nanorod with an aspect ratio ~3 (2.87~3.01) has a linewidth of ~30 nm (FWHM). These shapes potentially offer better options than Au nanospheres of FIG. 11.

Figure 16:
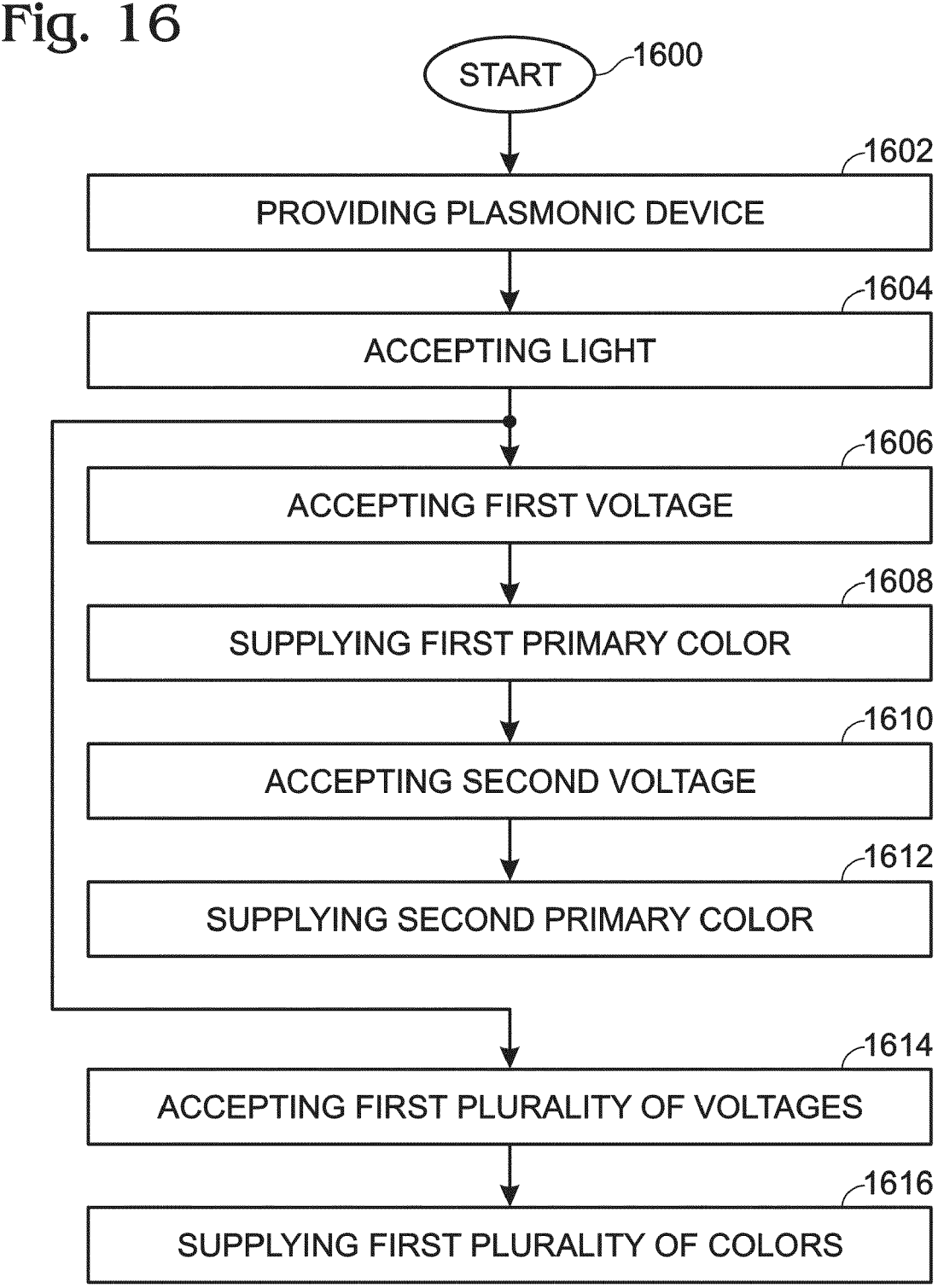
FIG. 16 is a flowchart illustrating a method for creating colors in the visible spectrum using a tunable plasmonic device with a partially modulated refractive index.

FIG. 16 is a flowchart illustrating a method for creating colors in the visible spectrum using a tunable plasmonic device with a partially modulated refractive index. Although the method is depicted as a sequence of numbered steps for clarity, the numbering does not necessarily dictate the order of the steps. It should be understood that in some aspects of the method these steps may be skipped, performed in parallel, or performed without the requirement of maintaining a strict order of sequence. The method starts at Step 1600.

Step 1602 provides a plasmonic device with an electrically conductive bottom electrode, a first dielectric layer overlying the bottom electrode, having a refractive index non-responsive to an electric field, a second dielectric layer overlying the first dielectric layer having a refractive index responsive to an electric field, an electrically conductive top electrode overlying the second dielectric layer, and a first plasmonic layer including a plurality of discrete plasmonic particles, interposed between the top and bottom electrodes. Examples of plasmonic devices are provided in the explanation of FIGS. 1, 4, and 5.

Step 1604 accepts a full-spectrum visible light incident to the top electrode. Step 1606 accepts a first voltage potential between the top and bottom electrodes, and generates a first electric field. Step 1608 supplies a first primary color in response to the first electric field, where a primary color exhibits a single wavelength peak with a spectral full width at half magnitudes (FWHMs) in the visible spectrum of light.

In one aspect, Step 1602 provides plasmonic particles arranged in either a random order or symmetrical array order, and Step 1608 supplies a first primary color with a wavelength responsive to the plasmonic particle order. In another aspect, Step 1602 provides plasmonic particles having a structure such as spherical, disk, composite shell, dome, egg, cup, rod, bar, pyramid, or star, and Step 1608 supplies a first primary color with a wavelength responsive to the plasmonic particle structure. In one variation, Step 1602 provides plasmonic particles comprising a plurality of (different) particle structures, and Step 1608 supplies a first primary color with a wavelength responsive to the plurality of plasmonic particle structures.

In a different aspect, Step 1602 provides plasmonic particles having a first particle size, and Step 1608 supplies a first primary color with a wavelength responsive to the first plasmonic particle size. In one variation, Step 1602 provides plasmonic particles comprising a plurality of (different) particle sizes, and Step 1608 supplies a first primary color with a wavelength responsive to the plurality plasmonic particle sizes. Further, Step 1602 may provide plasmonic particles having an average spacing between particles, and Step 1608 supplies a first primary color with a wavelength responsive to the plasmonic particle average spacing Step 1610 accepts a second voltage potential between the top and bottom electrodes, different from the first voltage potential, and generates a second electric field different from the first electric field. Step 1612 supplies a second primary color in response to the second electric field, different from the first primary color.

In one aspect, Step 1614 sequentially accepts a first plurality of voltage potentials between the top and bottom electrodes, sequentially generating a first plurality of electric fields. Then, Step 1616 sequentially supplies a first plurality of primary colors in response to the first plurality of electric fields.

A color-tunable plasmonic device with a partially modulated refractive index is provided, along with an associated tuning method. Examples of specific materials and structures have been used to illustrate the invention. However, the invention is not limited to merely these examples. Other variations and embodiments of the invention will occur to those skilled in the art.

We claim:

1. A color-tunable plasmonic device with a partially modulated refractive index, the device comprising:
   an electrically conductive bottom electrode;
   a first dielectric layer overlying the bottom electrode, having a refractive index non-responsive to an electric field:
   a second dielectric layer overlying the first dielectric layer having a refractive index responsive to an electric field;
   an electrically conductive top electrode overlying the second dielectric layer; and,
   a first plasmonic layer including a plurality of discrete plasmonic particles, interposed between the top and bottom electrodes.

2. The device of claim 1 wherein the first plasmonic layer overlies the first dielectric layer; and,
   wherein the second dielectric layer overlies the first plasmonic layer particles and exposed regions of the first dielectric layer between the first plasmonic layer particles.

3. The device of claim 1 wherein the first plasmonic layer overlies the bottom electrode; and,
   wherein the first dielectric layer overlies the first plasmonic layer particles and exposed regions of the bottom electrode between the first plasmonic layer particles.

4. The device of claim 3 further comprising:
   a second plasmonic layer of discrete plasmonic particles overlying the fust dielectric layer; and,
   wherein the second dielectric layer overlies the second plasmonic layer particles and exposed regions of the first dielectric layer between the second plasmonic layer particles.

5. The device of claim 1 wherein an electrode selected from a group consisting of the top electrode and the bottom electrode is optically reflective to a first range of wavelengths in the visible spectrum of light; and,
   wherein the unselected electrode is transparent to the first range of light wavelengths.

6. The device of claim 1 wherein the bottom electrode is transparent to a first range of wavelengths in the visible spectrum of light; and,
   wherein the top electrode is transparent to the first range of light wavelengths.

7. The device of claim 1 wherein the plasmonic particles in the first plasmonic layer are arranged in an order selected from a group consisting of random and a symmetrical array.

8. The device of claim 1 wherein the plasmonic particles in the first plasmonic layer have a structure selected from a group consisting of spherical, disk, composite shell, dome, egg, cup, rod, bar, pyramid, and star.

9. The device of claim 8 wherein the plasmonic particles in the first plasmonic layer comprise a plurality of particle structures.

10. The device of claim 1 wherein the plasmonic particles in the first plasmonic layer comprise a plurality of particle sizes.

11. The device of claim 1 wherein the plasmonic particles in the first plasmonic layer are a material selected from a group consisting of Ag, Au, Cu, Pt, Al, and alloys of the above-mentioned metals.

12. The device of claim 1 wherein the plasmonic particles in the first plasmonic layer have a size in a range of 10 nanometers (nm) to 300 nm.

13. The device of claim 1 wherein the first dielectric is a material selected from a group consisting of SiOx, SiNx, SiOxNy, MgF2, CaF2, SiOC, Teflon® AF, and organic polymers.

14. The device of claim 1 wherein the second dielectric is a material selected from a group consisting of ferroelectric liquid crystals, nematic liquid crystals, LiNbO3, Hg2 C12, LiTaO3, BBO, KTP, and organic electro-optical crystal 2,6-dibromo-N-methyl-4-nitroaniline.

15. The device of claim 1 wherein the second dielectric has a refractive index that varies between 1.0 and 3, in any direction, in response to an electric field.

16. The device of claim 1 wherein the plasmonic particles in the first plasmonic layer have an average spacing between particles.

17. The device of claim 16 wherein the average plasmonic particle spacing is in the range of about 700 nm, or less.

18. A method for creating colors in the visible spectrum using a tunable plasmonic device with a partially modulated refractive index, the method comprising:
   providing a plasmonic device with an electrically conductive bottom electrode, a first dielectric layer overlying the bottom electrode, having a refractive index non-responsive to an electric field, a second dielectric layer overlying the first dielectric layer having a refractive index responsive to an electric field, an electrically conductive top electrode overlying the second dielectric layer, and a first plasmonic layer including a plurality of discrete plasmonic particles, interposed between the top and bottom electrodes;
   accepting a full-spectrum visible light incident to the top electrode;
   accepting a first voltage potential between the top and bottom electrodes, generating a first electric field; and,
   supplying a first primary color in response to the first electric field, where a primary color exhibits a single wavelength peak with a spectral full width at half magnitudes (FWHMs) in the visible spectrum of light.

19. The method of claim 18 further comprising:
   accepting a second voltage potential between the top and bottom electrodes, different from the first voltage potential, and generating a second electric field different from the first electric field; and,
   supplying a second primary color in response to the second electric field, different from the first primary color.

20. The method of claim 18 further comprising:
   sequentially accepting a first plurality of voltage potentials between the top and bottom electrodes, sequentially generating a first plurality of electric fields; and, sequentially supplying a first plurality of primary colors in response to the first plurality of electric fields.

21. The method of claim 18 wherein providing the plasmonic device includes providing plasmonic particles arranged in an order selected from a group consisting of random and a symmetrical array; and, wherein supplying the first primary color includes supplying a first primary color with a wavelength responsive to the plasmonic particle order.

22. The method of claim 18 wherein providing the plasmonic device includes providing plasmonic particles having a structure selected from a group consisting of spherical, disk, composite shell, dome, egg, cup, rod, bar, pyramid, and star; and, wherein supplying the first primary color includes supplying a first primary color with a wavelength responsive to the plasmonic particle structure.

23. The method of claim 22 wherein providing the plasmonic device includes providing plasmonic particles comprising a plurality of particle structures; and, wherein supplying the first primary color includes supplying a first primary color with a wavelength responsive to the plurality of plasmonic particle structures.

24. The method of claim 18 wherein providing the plasmonic device includes providing plasmonic particles having a first particle size; and, wherein supplying the first primary color includes supplying a first primary color with a wavelength responsive to the first plasmonic particle size.

25. The method of claim 24 wherein providing the plasmonic device includes providing plasmonic particles comprising a plurality of particle sizes; and, wherein supplying the first primary color includes supplying a first primary color with a wavelength responsive to the plurality plasmonic particle sizes.

26. The method of claim 18 wherein providing the plasmonic device includes providing plasmonic particles having an average spacing between particles; and, wherein supplying the first primary color includes supplying a first primary color with a wavelength responsive to the plasmonic particle average spacing.

* * * * *